United States Patent
Tsubaki

(10) Patent No.: US 9,701,338 B2
(45) Date of Patent: Jul. 11, 2017

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/105,964

(22) PCT Filed: Aug. 5, 2015

(86) PCT No.: PCT/JP2015/072211
§ 371 (c)(1),
(2) Date: Jun. 17, 2016

(87) PCT Pub. No.: WO2016/047280
PCT Pub. Date: Mar. 31, 2016

(65) Prior Publication Data
US 2016/0318548 A1    Nov. 3, 2016

(30) Foreign Application Priority Data

| | | |
|---|---|---|
| Sep. 22, 2014 | (JP) | 2014-192973 |
| Sep. 30, 2014 | (JP) | 2014-199909 |
| Oct. 7, 2014 | (JP) | 2014-206360 |

(51) Int. Cl.
*B62D 6/00* (2006.01)
*B62D 6/06* (2006.01)
(Continued)

(52) U.S. Cl.
CPC ........... *B62D 6/008* (2013.01); *B62D 5/0472* (2013.01); *B62D 6/02* (2013.01); *B62D 6/06* (2013.01); *B62K 21/08* (2013.01); *B62D 5/0463* (2013.01)

(58) Field of Classification Search
CPC . B62D 6/008; B62D 6/06; B62D 6/02; B62D 5/0472; B62K 21/08
See application file for complete search history.

(56) References Cited

U.S. PATENT DOCUMENTS

| | | | | |
|---|---|---|---|---|
| 6,927,548 B2* | 8/2005 | Nishizaki | ............. | B62D 5/0472 318/432 |
| 7,873,453 B2* | 1/2011 | Kobayashi | ........... | B62D 5/0472 701/41 |

(Continued)

FOREIGN PATENT DOCUMENTS

| | | |
|---|---|---|
| JP | 2006-188183 A | 7/2006 |
| JP | 2006-199219 A | 8/2006 |

(Continued)

OTHER PUBLICATIONS

International Search Report for PCT/JP2015/072211 dated Nov. 2, 2015 [PCT/ISA/210].

(Continued)

*Primary Examiner* — Dale W Hilgendorf
(74) *Attorney, Agent, or Firm* — Sughrue Mion, PLLC

(57) ABSTRACT

An electric power steering apparatus that suppresses the vibration of the operating member and improves the steering feeling due to the characteristic compensation of the assist map, without a change of a proportional and integral (PI) control gain in the current control section. The electric power steering apparatus includes a first compensating section provided at a front stage of the assist map and a second compensating section provided at a rear stage of the assist map. A current command value is calculated with a characteristic of which sloping increases for an absolute value of the steering torque being input into the first compensating section and being output from the second compensating section. Therefore, vibrations of operating members are suppressed.

20 Claims, 19 Drawing Sheets

(51) Int. Cl.
   *B62D 6/02*    (2006.01)
   *B62D 5/04*    (2006.01)
   *B62K 21/08*   (2006.01)

(56) References Cited

U.S. PATENT DOCUMENTS

| | | | | |
|---|---|---|---|---|
| 8,267,220 B2* | 9/2012 | Sugiyama | ............ | B62D 5/0472 |
| | | | | 180/443 |
| 8,626,394 B2* | 1/2014 | Kezobo | ................ | B62D 5/0472 |
| | | | | 180/443 |
| 2006/0012323 A1* | 1/2006 | Endo | .................... | B62D 5/0472 |
| | | | | 318/432 |
| 2007/0017735 A1* | 1/2007 | Kataoka | ............... | B62D 5/0472 |
| | | | | 180/446 |
| 2007/0107978 A1* | 5/2007 | Aoki | .................... | B62D 5/0472 |
| | | | | 180/446 |
| 2008/0191655 A1* | 8/2008 | Ueda | .................... | B62D 5/0487 |
| | | | | 318/449 |
| 2008/0277192 A1* | 11/2008 | Nishimura | ........... | B62D 5/0472 |
| | | | | 180/444 |
| 2009/0079373 A1* | 3/2009 | Nagase | ................ | B62D 5/0487 |
| | | | | 318/434 |

FOREIGN PATENT DOCUMENTS

| | | |
|---|---|---|
| JP | 2009-6939 A | 1/2009 |
| JP | 2014-58295 A | 4/2014 |

OTHER PUBLICATIONS

Written Opinion for PCT/JP2015/072211 dated Nov. 2, 2015 [PCT/ISA/237].

\* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2015/072211, filed on Aug. 5, 2015, which claims priority from Japanese Patent Application Nos. 2014-192973, filed on Sep. 22, 2014, 2014-199909, filed on Sep. 30, 2014, and 2014-206360, filed on Sep. 7, 2014, the contents of all of which are incorporated herein by reference in their entirety.

TECHNICAL FIELD

The present invention relates to an electric power steering apparatus that drives a motor by means of a current command value calculated with an assist map inputting a steering torque and applies an assist force to a steering system of a vehicle, and in particular to an electric power steering apparatus that suppresses a vibration of a handle (an operating member) occurring due to a handle inertia and a spring characteristic of a torsion bar, suppresses a vibration that a driver feels uncomfortable and improves a steering feeling by providing phase compensating sections of reverse characteristic at a front stage and a rear stage of the assist map, or by providing a band pass filter (BPF) at the front stage of the assist map, a notch filter (a band stop filter) at the rear stage and by taking reverse transfer functions each other for the BPF and the notch filter, or providing a lead-system compensating section at the front stage of the assist map and a delay-system compensating section being a reverse transfer function at the rear stage.

BACKGROUND ART

An electric power steering apparatus (EPS) which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft) 2 connected to a steering wheel (handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Th of the steering wheel 1, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist command with an assist map based on a steering torque Th detected by the torque sensor 10 and a vehicle speed Vel detected by a vehicle speed sensor 12, and controls a current supplied to the motor 20 based on a voltage control value Vref obtained by performing compensation and so on with respect to the current command value. A steering angle sensor 14 is not indispensable and may not be provided. It is possible to obtain the steering angle θ from a rotational sensor such as a revolver connected to the motor 20.

A controller area network (CAN) 40 to send/receive various information and signals on the vehicle is connected to the control unit 30, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

In such the electric power steering apparatus, the control unit 30 mainly comprises a central processing unit CPU (or a micro-processing unit MPU or a micro-controller unit MCU), and general functions performed by programs within the CPU are shown in FIG.2. As shown in FIG.2, the steering torque Th detected by the torque sensor 10 and the vehicle speed Vel detected by the vehicle speed sensor 12 are inputted into a current command value.

A deviation I (=Irefm-Im) being a subtraction result at the subtracting section 32B is inputted into a PI-control section 35, the PI-controlled voltage command value Vref is inputted into a PWM-control section 36 and is calculated duty ratios, and the motor 20 is PWM-driven through an inverter 37 with PWM-signals. The motor current value Im of the motor 20 is detected by a motor current detector 38 and is fed back to the subtracting section 32B. A rotational sensor 21 such as a revolver is connected to the motor 20 and the steering angle θ is outputted.

The compensating section 34 adds a self-aligning torque (SAT) 343 detected or estimated with an inertia 342 at an adding section 344, further adds the result of addition performed at the adding section 344 with a convergence 341 at an adding section 345, and then outputs the result of addition performed at the adding section 345 as the compensation signal CM thereby to improve the characteristic of the current command value.

As mentioned above, the conventional electric power steering apparatus generally generates a control signal for controlling the motor with the PI-control in a current control section, and a PI-control gain (a proportional gain and an integral gain) is suitably adjusted corresponding to a kind of the vehicle.

When the gain of the PI-control becomes great, a noisy sound and a vibration due to a noise or the like occur. For example, in a case that the motor is a brush motor and a steering holding operation to hold a constant steering angle is performed by applying the steering torque to the handle, a motor current becomes discontinuous due to a variation of impedance between a commutator and a brush. This action becomes a trigger, the current variation occurs, and then the vibration to the handle and the noisy sound are generated. In this connection, it is necessary to restrict the PI-control gain so as not to occur the vibration and the noisy sound. However, if the PI-control gain is restricted as stated above, a frequency characteristic of the current control is abated and there is a problem that it is difficult to improve a responsibility of the assist control.

Further, even if the PI-control gain is efficiently abated, it is perfectly impossible to prevent the vibration in the vicinity of a resonant frequency of the steering system and a comfortable steering feeling is not always obtained.

The electric power steering apparatus for solving the above problem is proposed in Japanese Published Unexamined Patent Application No. 2006-188183 A (Patent Document 1). The electric power steering apparatus disclosed in Patent Document 1 comprises a vibration detecting section to detect the vibration of the handle, a continuing time that the vibration detecting section is detecting the vibration is counted by a continuing time counting section and the gain setting section variably sets the gain of the PI-control section. The vibration detecting section detects due to the motor angular velocity and the steering torque whether the vibration occurs at the handle or not.

THE LIST OF PRIOR ART DOCUMENTS

Patent Documents

Patent Document 1: Japanese Published Unexamined Patent Application No. 2006-188183 A

SUMMARY OF THE INVENTION

Problems to be Solved by the Invention

However, since the electric power steering apparatus disclosed in Patent Document 1 changes the PI-control gain in the current control section for the vibration suppression, there is a possibility to occur the above inconvenience. That is, the change of the PI-control gain influences to another controls and the steering feeling.

The present invention has been developed in view of the above-described circumstances, and the object of the present invention is to provide an electric power steering apparatus that suppresses the vibration of the operating member such as the handle and improves the steering feeling due to the characteristic compensation of the assist map, without changing the (Proportional and Integral) PI-control gain in the current control section.

Means for Solving the Problems

The present invention relates to an electric power steering apparatus that calculates a current command value with reference to an assist map inputting a steering torque and assist-controls a steering system of a vehicle by driving a motor based on the current command value, the above-described object of the present invention is achieved by that comprising: a first compensating section provided at a front stage of the assist map; and a second compensating section provided at a rear stage of the assist map; wherein the current command value is calculated with a characteristic of which sloping increases for an absolute value of the steering torque being inputted into the first compensating section and is outputted from the second compensating section, and vibrations of operating members are suppressed.

Further, the above-described object of the present invention is more effectively achieved by that wherein the first compensating section is a first phase compensating section and the second compensating section is a second phase compensating section, and the first phase compensating section and the second phase compensating section are reverse characteristic each other, or wherein the first phase compensating section is a phase-lead compensation and the second phase compensating section is a phase-delay compensation, or wherein a setting frequency of a zero point of the first phase compensating section is lower than a handle frequency and is set to 3 [Hz] or more, or wherein a setting frequency of a pole of the first phase compensating section is higher than a handle frequency, or wherein setting frequencies of a pole and a zero point of the second phase compensating section are respectively within a range of ±10% for setting frequencies of a pole and a zero point of the first phase compensating section, or wherein the first compensating section is a band pass filter, the second compensating section is a notch filter, and the band pass filter and the notch filter are reverse transfer function characteristic each other, or wherein degrees of the band pass filter and the notch filter are respectively equal to or more than secondary order, or wherein a peak frequency set at the band pass filter is set in a vicinity of a handle frequency, or wherein a peak frequency set at the notch filter is within a range of ±10% for the peak frequency set at the band pass filter, or wherein the first compensating section is a lead-system compensating section, the second compensating section is a delay-system compensating section, and the lead-system compensating section and the delay-system compensating section are reverse transfer function characteristic each other, or wherein the lead-system compensating section is a primary lead-compensation, and the delay-system compensating section is a primary delay-compensation, or wherein the lead-system compensating section is equal to or more than secondary lead-compensation, and the delay-system compensating section is equal to or more than secondary delay-compensation, or wherein a cut-off frequency set at the lead-system compensating section is lower than a handle frequency and is set to 3 [Hz] or more, or wherein a cut-off frequency set at the delay-system compensating section is within a range of ±10% for the cut-off frequency set at the lead-system compensating section, or wherein the assist map is a vehicle speed sensitive-type.

Effects of the Invention

The electric power steering apparatus of according to the present invention, at a calculating time of a current command value with an assist map, performs a phase-lead compensation before the calculation with the assist map and does the phase compensation of the reverse phase-delay after the calculation, or enlarges an amplitude of the filter-passed signal component with a BPF before the calculation with the assist map and performs a characteristic compensation with a notch filter of a reverse transfer function after the calculation, or performs a lead-system compensation before the calculation with the assist map and does the delay-system compensation of the reverse transfer function after the calculation. Therefore, the present invention is capable of suppressing the vibration occurring on the operating member such as the handle without changing the PI-control gain in the current control section and of improving the steering feeling of the driver.

Further, according to the present invention, it is possible to reduce the handle vibration due to the influence the resonance of a suspension system of the vehicle such as brake judder and shimmy, the handle vibration due to a matter that a force is transmitted from a road surface to the steering system during a bad road running and the handle vibration due to another factors.

MODE FOR CARRYING OUT THE INVENTION

The present invention, without change of a PI-control gain in a current control section, can suppress a vibration of an operating member such as a handle by using a phase-lead compensation at a front stage of an assist map for calculating a current command value and a phase-delay compensation at a rear stage of the assist map, or by performing a characteristic compensation by providing a band pass filter (BPF) at the front stage of the assist map for calculating the current command value and a notch filter (a band stop filter, a band removal filter, a band limit filter) having a reverse transfer characteristic at the rear stage, or by using a lead-system compensation at the front stage of the assist map for calculating the current command value and a delay-system compensation of the reverse transfer characteristic at the rear stage. Consequently, the present invention does not influence to a steering feeling at an operating time (around 3 [Hz] or less), and acts into a direction to suppress to a handle frequency 10 [Hz] and can put the influence to another control and the steering feeling in the minimum.

The present invention can suppress the vibration by providing the phase compensations of reverse characteristic at the front stage and the rear stage of the assist map, or can suppress the vibration by providing the BPF and the notch filter of reverse characteristic at the front stage and the rear stage of the assist map, or can suppress the vibration by providing a lead-system compensation of a primary, a secondary or more degree at the front stage of the assist map and a delay-system compensation of a primary, a secondary or more degree of the reverse transfer characteristic at the rear stage of the assist map. It is possible to improve the steering feel of the driver in the above any cases.

Hereinafter, embodiments of the present invention will be described in detail with reference to the accompanying drawings.

Figure 4:
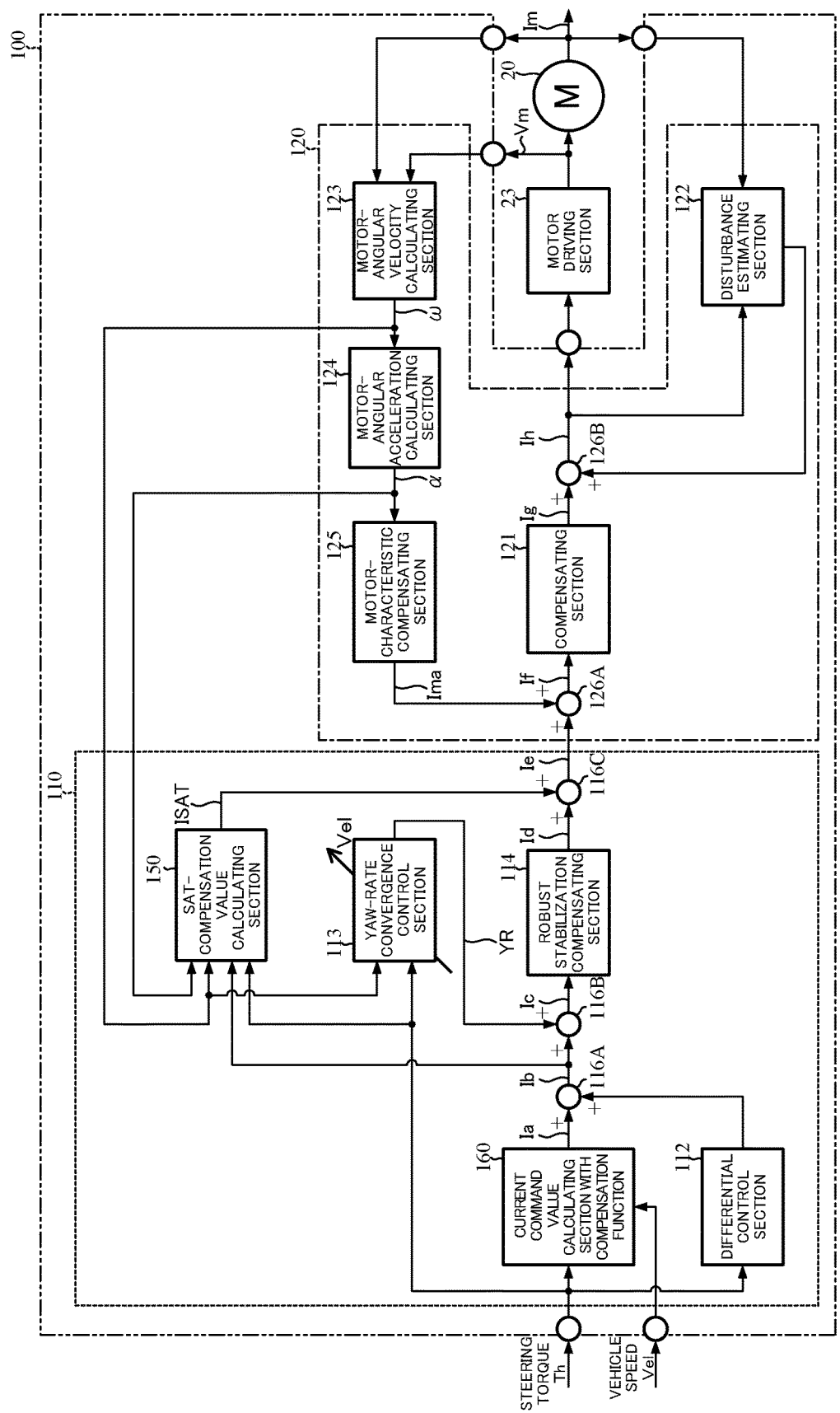
FIG. 4 is a block diagram showing a constitution example of the present invention.

FIG. 4 shows a constitution example of the present invention, a control unit 100 comprises a torque-system control section 110 indicated by a dashed line to control by using a steering torque Th, a vehicle speed Vel, a steering angle velocity (a motor angular velocity) ω and a steering angle acceleration (a motor angular acceleration) α and a motor-system control section 120 indicated by a dashed-dotted line to perform a control relating to a driving of a motor 20 by means of a motor driving section 23 comprised of an inverter and so on.

The torque-system control section 110 comprises of a current command value calculating section 160 with a compensation function, a differential control section 112, a yaw-rate convergence control section 113, a robust stabilization compensating section 114 and a self-aligning torque (SAT)-compensation value calculating section 150 and further includes adding sections 116A, 116B, 116C. Further, the motor-system control section 120 comprises of a compensating section 121, a disturbance estimating section 122, a motor-angular velocity calculating section 123, a motor-angular acceleration calculating section 124 and a motor characteristic compensating section 125 and includes adding sections 126A and 126B.

Figure 1:
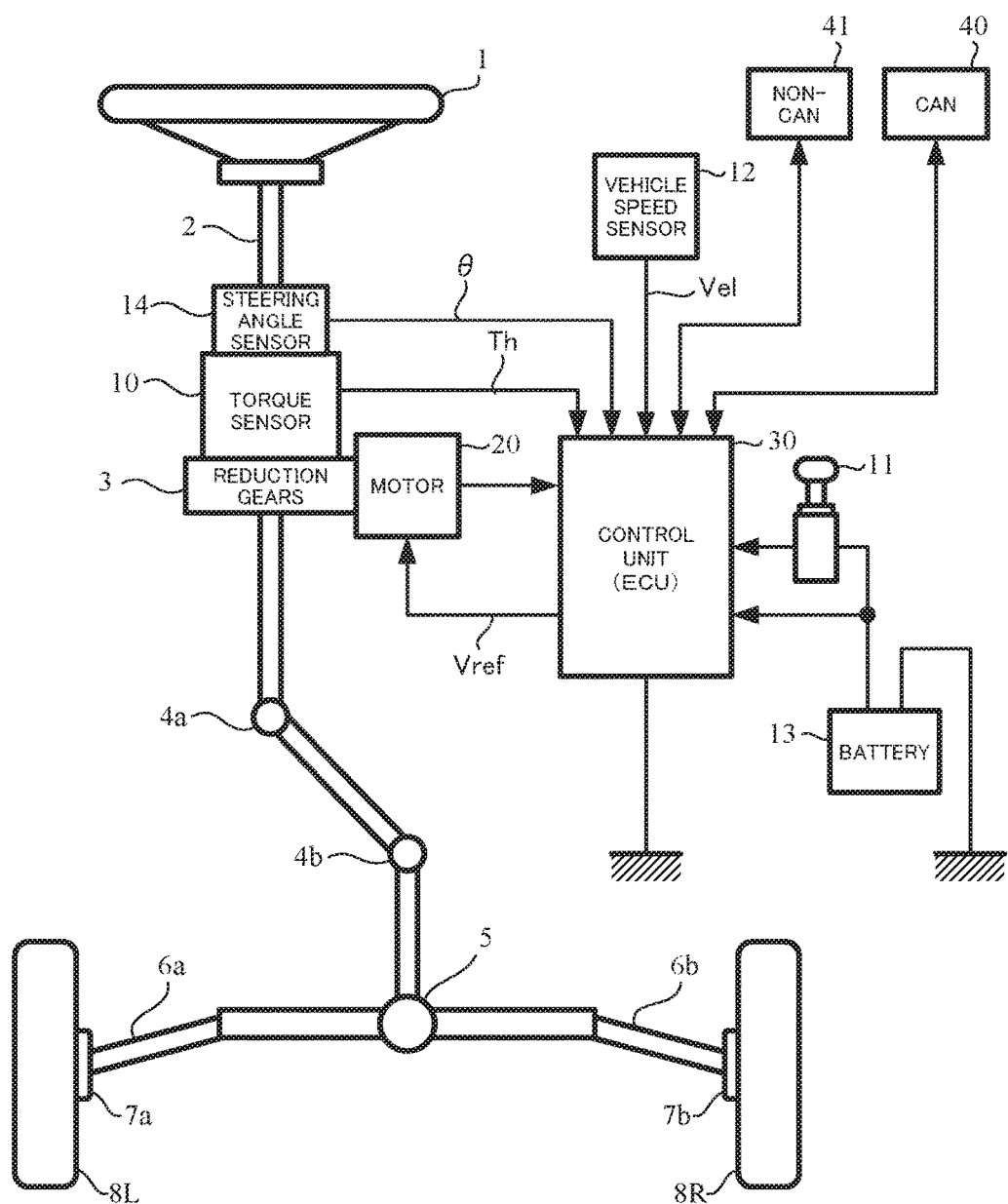
FIG. 1 is a configuration diagram illustrating a general outline of an electric power steering apparatus.
Figure 2:
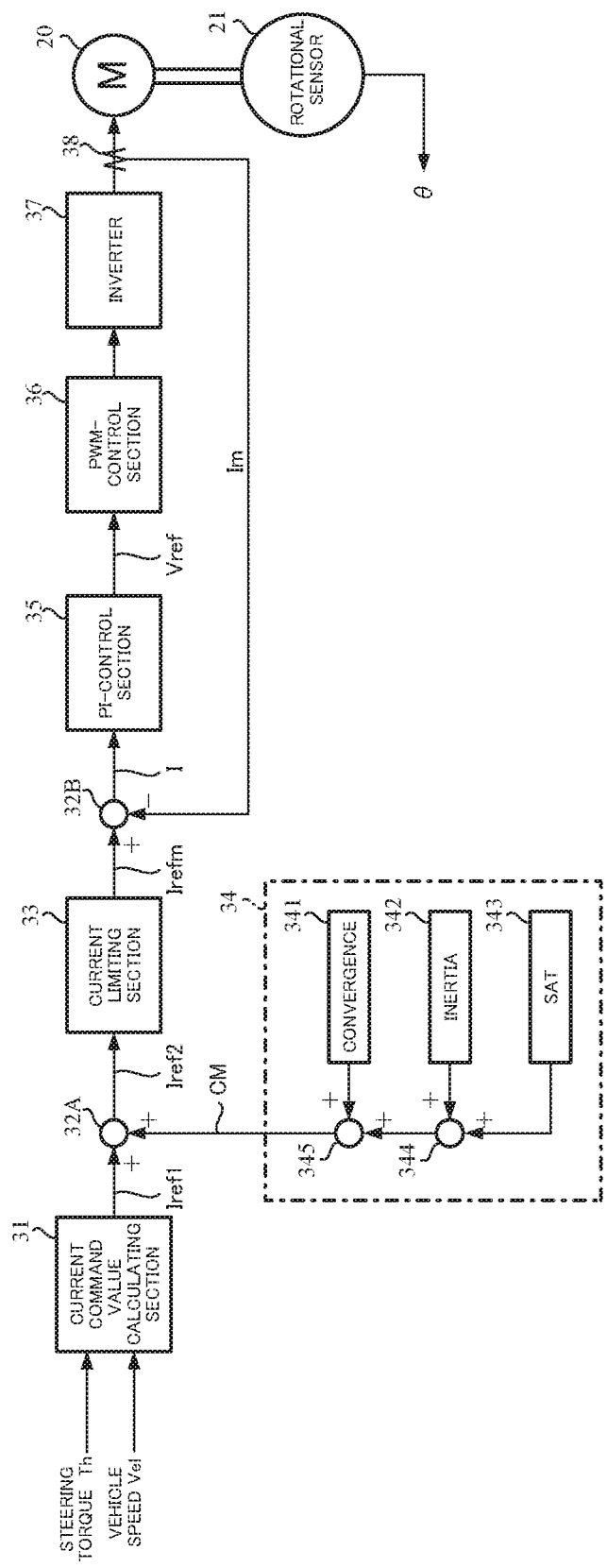
FIG. 2 is a block diagram showing a constitution example of a control system of the electric power steering apparatus.
Figure 3:
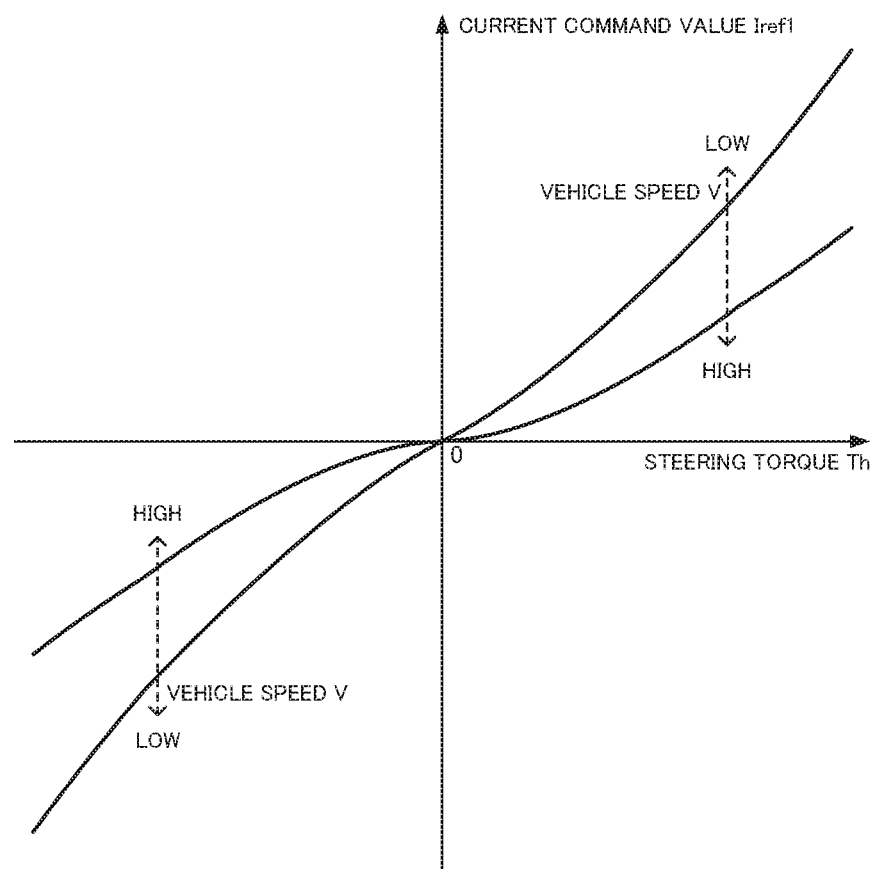
FIG. 3 is a characteristic chart showing an example of an assist map to calculate a current command value.
Figure 5:
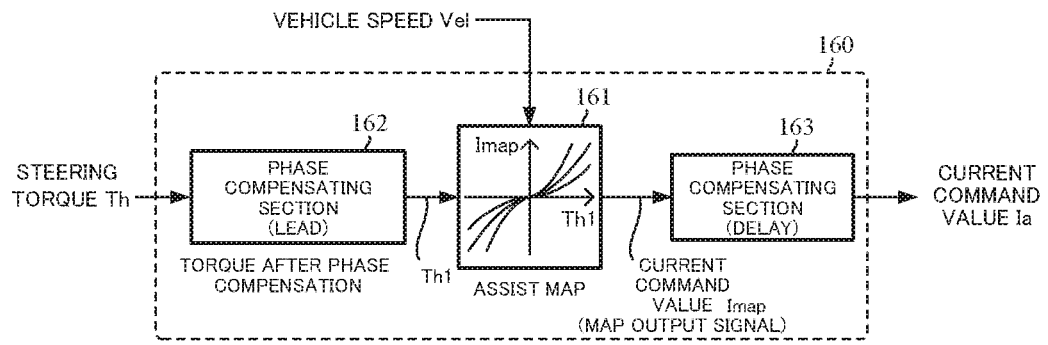
FIG. 5 is a block diagram showing a constitution example of a current command value calculating section (the first embodiment) with a compensation function according to the present invention.

The steering torque Th is inputted into the current command value calculating section 160 with a compensation function, the differential control section 112, the yaw-rate convergence control section 113 and the SAT-compensation value calculating section 150, the vehicle speed Vel is inputted into the current command value calculating section 160 with a compensation function, and further the vehicle speed Vel is also inputted into the yaw-rate convergence control section 113 as a parameter. Although the current command value calculating section 160 with a compensation function calculates a current command value Ia with an assist map based on the steering torque Th and the vehicle speed Vel, the first embodiment provides a phase compensating section (the first compensating section) 162 and a phase compensating section (the second compensating section) 163 which are reverse characteristic each other at a front stage and a rear stage of the assist map 161 as shown in FIG. 5. The phase compensating section 162 has a phase-lead function for the inputted steering torque Th, and the steering torque Th1 after the phase compensation which is phase-lead compensated in the phase compensating section 162, is inputted into the assist map 161. The assist map 161 has a similar characteristic (the characteristic that the sloping increases for an absolute vale of the inputted torque Th1) to FIG. 3 and outputs a current command value (a map output signal) Imap corresponding to the steering torque Th1 after the phase compensation with a vehicle speed sensitive-type. The current command value (the map output signal) Imap is inputted into the phase compensating section 163 of the rear stage, and the current command value Ia which is phase-delay compensated in the phase compensating section 163 is outputted and is inputted into the adding section 116A.

A setting frequency [Hz] of a zero point of the phase-lead compensation of the phase compensating section 162 being provided at the front stage of the assist map 161, by making a zero point is lower than the handle frequency [Hz] and making a pole is high, is set to 3 [Hz] or more in a steering region so that the vibration component of the handle frequency is not influenced to the steering feeling. A setting frequency [Hz] of the pole of the phase-lead compensation is set more than the handle frequency [Hz]. Further, the setting frequencies [Hz] of a pole and a zero point of the phase-delay compensation of the phase compensating section 163 being provided at the rear stage of the assist map 161 may be within ±10% of a range that the phase compensating section 162 put in the reverse characteristic of the phase compensating section 163 for the setting frequencies of the zero point and the pole of the phase-lead compensation of the phase compensating section 162.

The differential control section 112 enhances a responsibility of the control in the vicinity of a neutral point of the steering and has a function to realize a soft and a smooth steering. The output of the differential control section 112 is added with the current command value Ia at the adding section 116A, and the current command value Ib being an addition result, is inputted into the SAT-compensation value calculating section 150 and the adding section 116B.

The yaw-rate convergence control section 113 inputs the steering torque Th and the steering angle velocity ω and puts on the brake to an action of a handle swing to improve the convergence with respect to the yaw of the vehicle. The yaw rate signal YR of the yaw-rate convergence control section 113 is added with the current command value Ib at the adding section 116B and the current command value Ic being the addition result, is inputted into the robust stabilization compensating section 114.

Further, the SAT-compensation value calculating section 150 inputs the steering torque Th, the current command value Ib from the adding section 116A, the steering angle velocity ω from the motor-angular velocity calculating section 123 and the steering angle acceleration α from the motor-angular acceleration calculating section 124, estimates the SAT-value, signal-processes the estimated SAT-value by using a filter and a gain section, and outputs an SAT-compensation value ISAT to give a suitable road surface information to the handle as a reaction force. The SAT-compensation value ISAT is inputted into the adding section 116C.

Furthermore, although the current command value Ic obtained at the adding section 116B is inputted into the robust stabilization compensating section 114, the robust stabilization compensating section 114 is a section such as a compensating section disclosed in Japanese Published Unexamined Patent Application No. H8-290778 A. That is, the compensating section removes a peak value in a resonance frequency of a resonance system comprising of an inertia element and a spring element included in the detected torque, and compensates a phase shift of the resonance frequency that obstructs the responsibility and the stability of the control system. The current command value Id being the output of the robust stabilization compensating section 114 is added with the SAT-compensation value ISAT at the adding section 116C, and the added current command value Ie is inputted into the adding section 126A in the motor-system control section 120.

Moreover, the motor angular velocity calculating section 123 in the motor-system control section 120 calculates the steering angle velocity (the motor angular velocity) ω based on the voltage Vm applied between the motor terminals and the motor current Im, and the steering angle velocity ω is inputted into the motor angular acceleration calculating section 124, the yaw-rate convergence control section 113 and the SAT-compensation value calculating section 150. The motor angular acceleration calculating 124 calculates the steering angle acceleration α based on the inputted steering angle velocity ω, and the steering angle acceleration α is inputted into the motor characteristic compensating section 125 and the SAT-compensation value calculating section 150. The motor characteristic signal Ima from the motor characteristic compensating section 125 is added with the current command value Ie at the adding section 126A, and the current command value If being the addition result, is inputted into the compensating section 121 comprising a differential compensator and so on. A signal that the current command value Ig compensated at the compensating section 121 is added with the output of the disturbance estimating section 122 at the adding section 126B, is inputted into the motor driving section 23 and the disturbance estimating section 122.

The disturbance estimating section 122 is such an apparatus disclosed in Japanese Published Unexamined Patent Application No. H8-310417 A, is capable of maintaining a desired motor control characteristic in an output reference of the control system based on a current command value Ih obtained by adding the output of the disturbance estimating section 122 with the current command value Ig compensated by the compensating section 121 that is the control target of the motor output and the motor current Im, and acts not to lose the stabilization of the control system.

Figure 6:
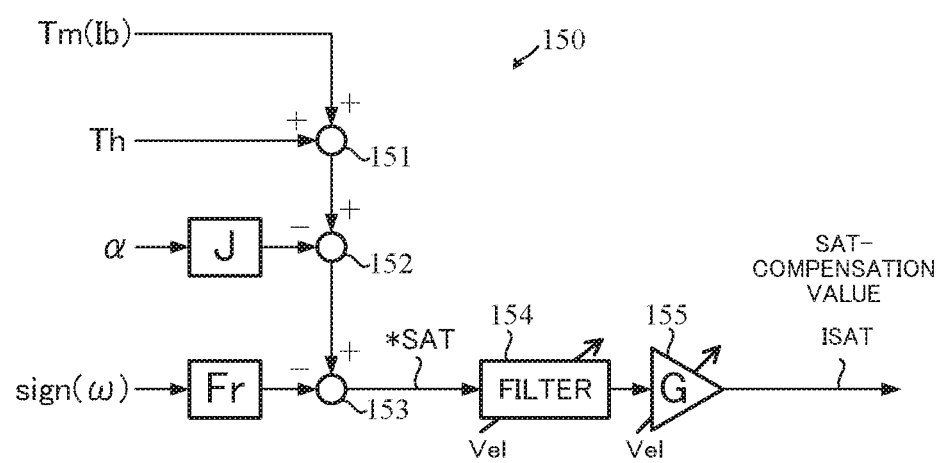
FIG. 6 is a block diagram showing a constitution example of an SAT-compensation value calculating section.

FIG. 6 shows a constitution example of the SAT-compensation value calculating section 150, a current command value Ib corresponding to an assist force Tm and the steering torque Th are added at an adding section 151, the addition result is input into a subtracting section 152, and then is subtracted by a signal that is the steering angle acceleration α multiplied by an intertia J of the motor. The subtracted result is input into a subtracting section 153 and is subtracted by a signal that is multiplied a plus sign or a minus sign of the steering angle velocity ω with a static friction Fr. The subtracted result at the subtracting section 153 is the SAT-estimation value *SAT (e.g. Japanese Published Unexamined Patent Application No. 2008-18825 A), the SAT-estimation value *SAT is inputted into a vehicle speed sensitive-filter 154 having a frequency characteristic, and the SAT-compensation value ISAT is obtained by multiplying a gain (G) at a vehicle speed sensitive-gain section 155.

Moreover, the filter 154 is a phase-delay filter having a gain to fully abate a size of the SAT-estimation value *SAT to a necessary value as a static characteristic gain. Further, the gain section 155 has a function to decrease the SAT-compensation value ISAT in a case that an importance of the road surface information such as a static steering and a low speed running comparatively is low.

Figure 7:
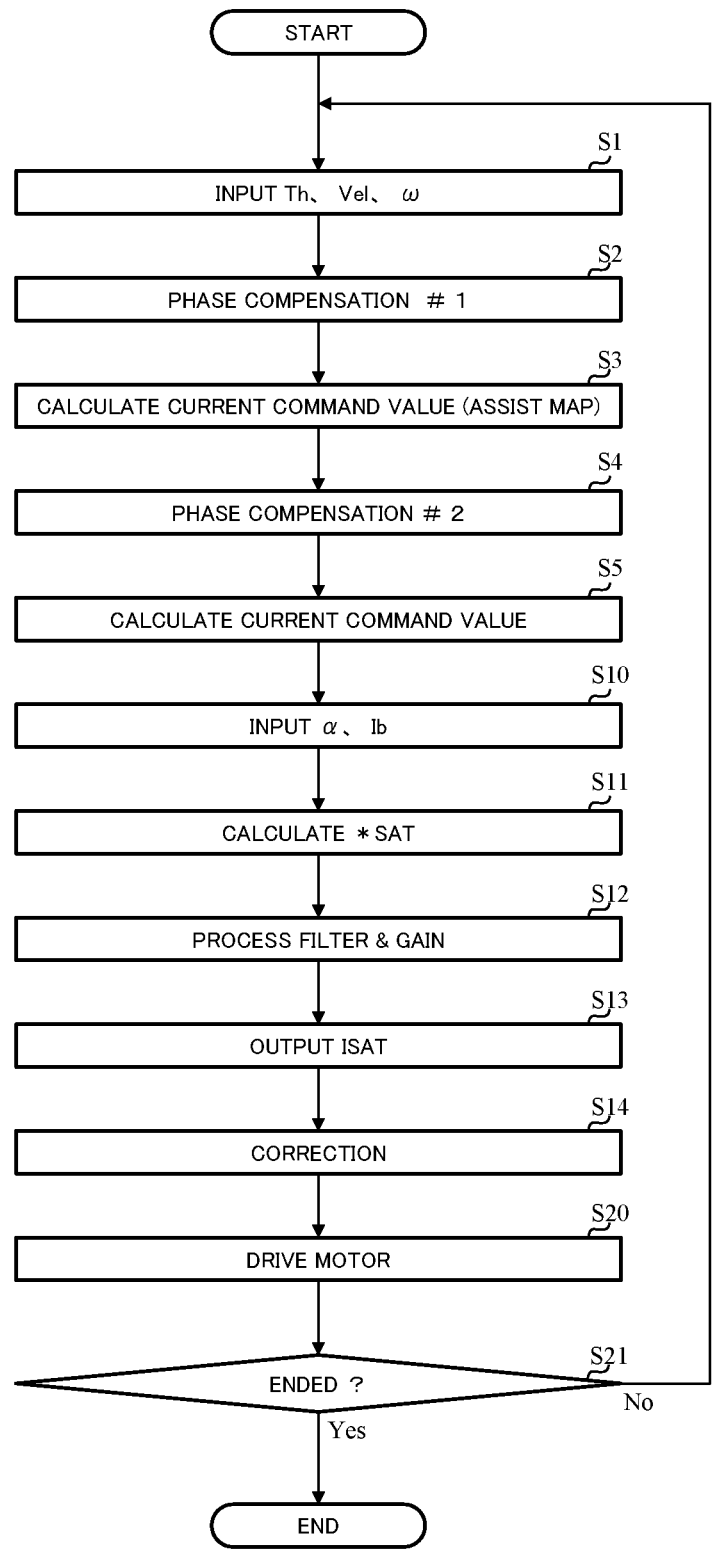
FIG. 7 is a flow chart showing an operation example (the first embodiment) of the present invention.

In such a constitution, an operation example (the first embodiment) of the present invention will be described with reference to a flow chart of FIG. 7.

Figure 8:
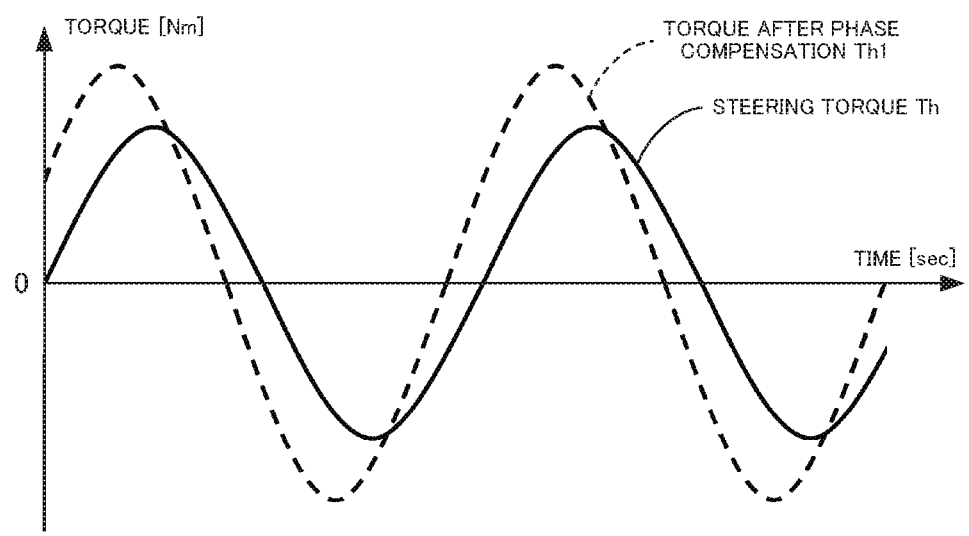
FIG. 8 is a characteristic diagram showing an example of a characteristic of a phase compensating section (phase-lead)

First, the steering torque Th, the vehicle speed Vel and the steering angle velocity ω are inputted (Step S1), and the steering torque Th is phase-lead compensated at the phase compensating section 162 (Step S2). FIG. 8 shows a phase compensation characteristic example of the phase compensating section 162, a phase of the steering torque Th1 after the phase compensation passed through the phase compensating section 162 of the phase-lead leads as shown with a dashed-line, due to the resonance of the inertia of the handle and the spring characteristic of the torsion bar, in a case that the steering torque Th vibrates as shown with a real line in FIG. 8, and the phase amplitude becomes greater than the steering torque Th before the compensation.

Figure 9:
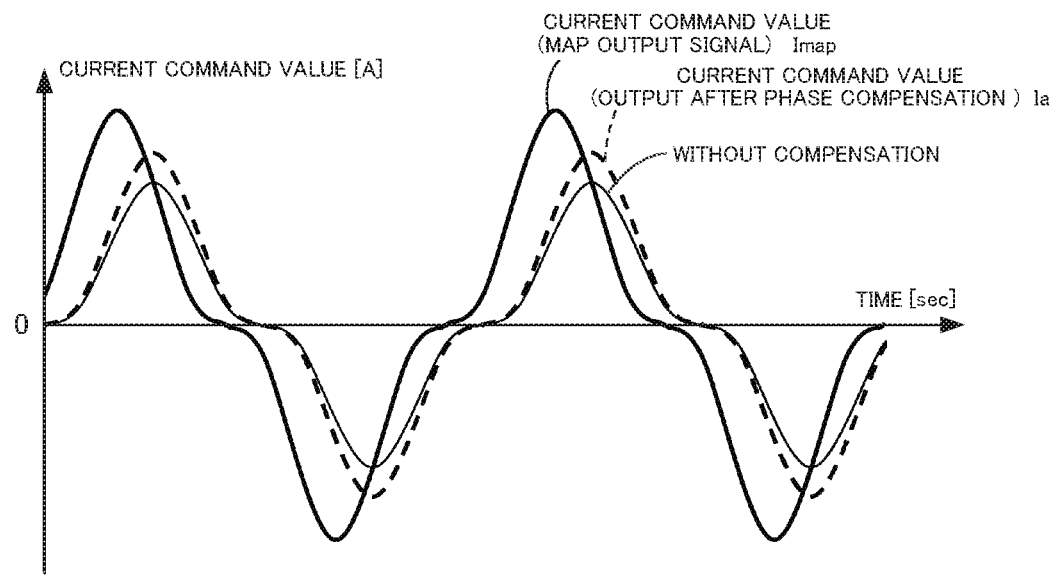
FIG. 9 is a characteristic diagram showing an example of a characteristic of a phase compensating section (phase-delay)

Then, the steering torque Th1 after the phase compensation is inputted into the assist map 161 and the current command value (the map output signal) Imap is calculated (Step S3), and the current command value Imap is inputted into the phase compensating section 163 at the rear stage and is phase-delay compensated (Step S4). The phase characteristic of the phase compensating section 163 is delayed as shown by a dashed-line in FIG. 9 for the current command value (the map output signal) Imap of a real line (thick line) being inputted into the phase compensating section 163 and outputs the current command value Ia of which amplitude is small. The phase does not change in comparison with a signal without the compensation which does not have the phase compensating section 160 and the amplitude become great. The increasing of the component of the vibrating frequency acts to suppress the handle vibration.

Figure 10A:
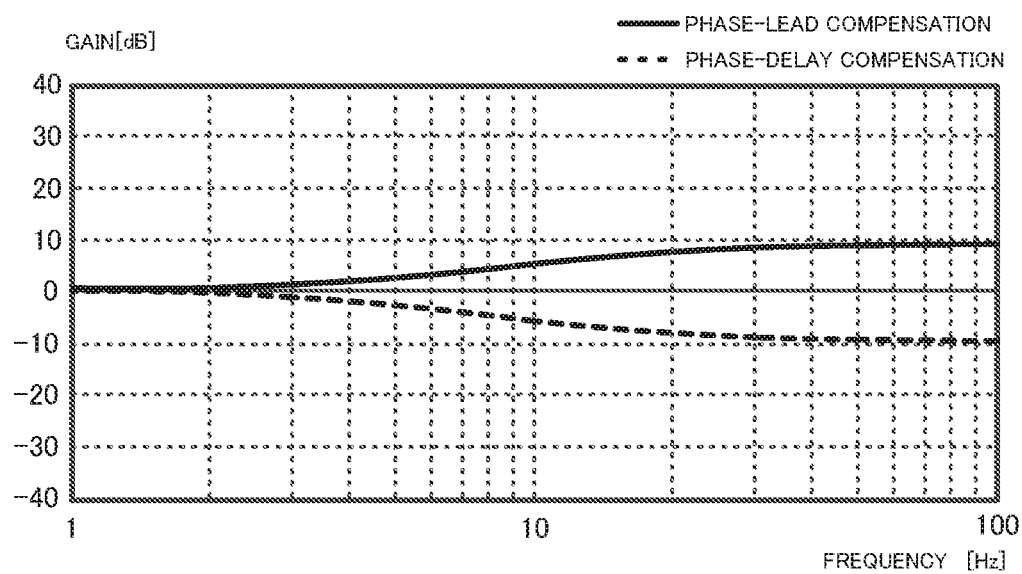
FIGS. 10A and 10B are Bode diagram showing a characteristic example of the phase compensating section (phase-lead, phase-delay)
Figure 10B:
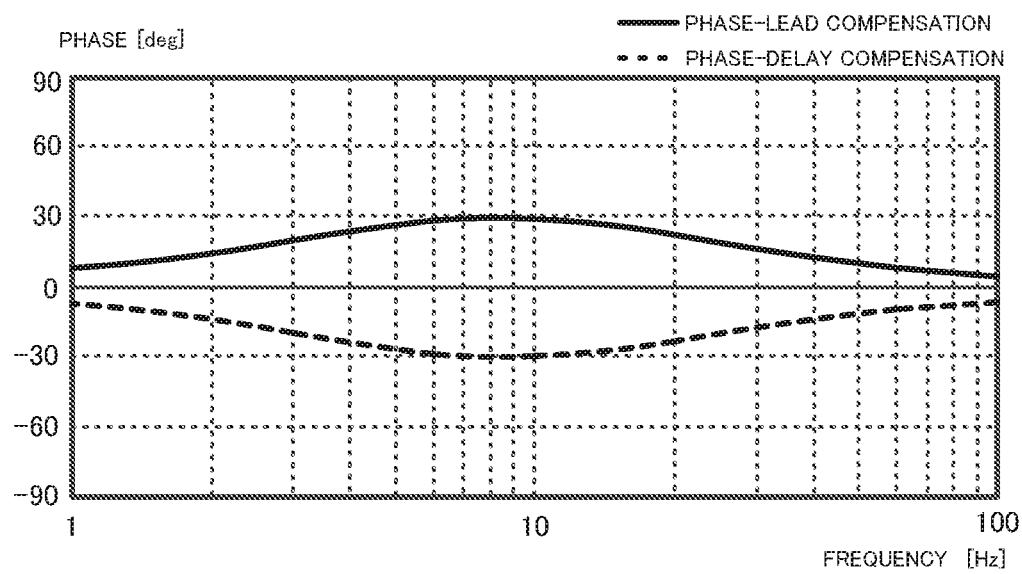

Moreover, the respective gains of the phase-lead compensation of the phase compensating section 162 and the phase-delay compensation of the phase compensating section 163 as well as the frequency characteristics of the respective phases are shown in Bode diagram in FIGS. 10A and 10B.

The current command value Ia calculated at the current command value calculating section 160 with a compensation function becomes a current command value Ib by adding at the adding section 116A with the differential value from the differential control section 112, and the yaw-rate signal YR is calculated at the yaw-rate convergence control section 113. The current command value Ic added the yaw-rate signal YR at the adding section 116B is outputted as the current command value Id through the robust stabilization compensating section 114 (Step S5).

The current command value Ib and the steering angle acceleration α calculated at the motor-angular acceleration calculating section 124 are inputted into the SAT-compensation value calculating section 150 (Step S10), and the SAT-estimated value *SAT is calculated at the adding sections 151 and 152 and the subtracting section 153 (Step S11). The SAT-estimated value *SAT is filter-processed at the filter 154 and is gain-processed at the gain section 155 (Step S12), and the SAT-compensated value ISAT is outputted (Step S13). The current command value Id is corrected at the adding section 116C (Step S14), the corrected current command value Ie is inputted into the motor-system control section 120, and the motor 20 is driven through the compensating section 121 and the motor driving section 23 (Step S20). The above operations are repeated until the ending (Step S21).

Figure 11:
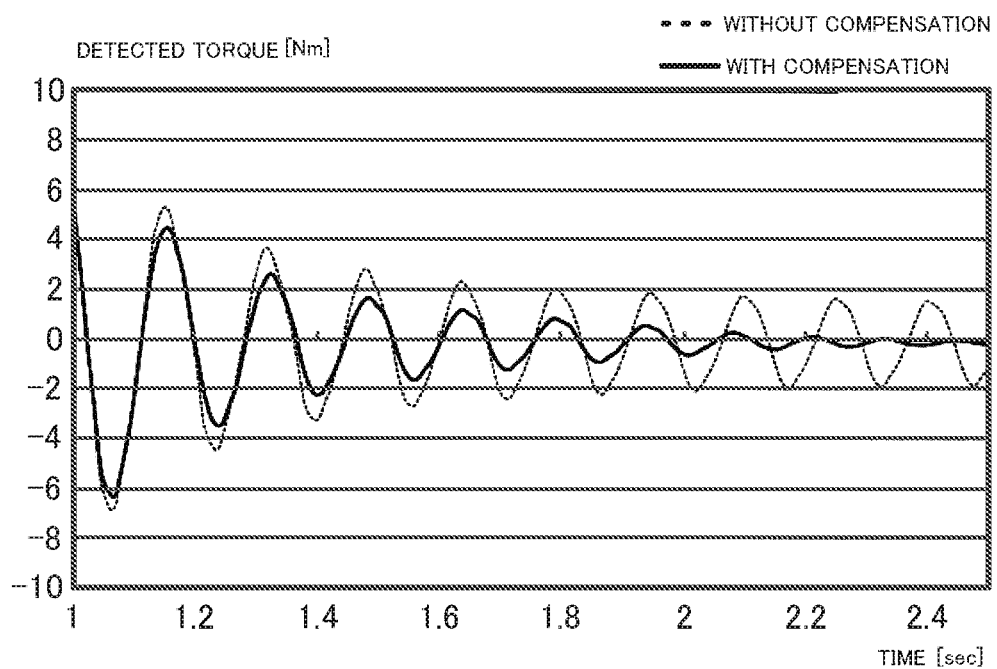
FIG. 11 is a characteristic diagram showing an example (with compensation, without compensation) of a time responsibility of the steering torque.

FIG. 11 is a characteristic chart showing an example operation of the present invention (the first embodiment) and shows a time response (dashed line) of the steering torque (proportional to a torsion angle of the torsion bar) when the disturbance torque is applied with no hands at a state that the easy occurring of the handle vibration is intentionally prepared. FIG. 11 shows a simulation result (real line) in comparison with presence of the provisions of the phase compensations at the front and the rear stages of the assist map. The phase-lead and the phase-delay compensations using the simulation are respectively a primary phase-lead and a primary phase-delay, and have the frequency characteristic of FIG. 10. Consequently, it is clear that the convergence of the vibration is rapid by phase-compensating at the front and the rear stages of the assist map and that the vibration is suppressed.

Moreover, two phase-compensating sections provided at the front and the rear stages of the assist map may be changed with a vehicle speed sensitivity or a torque sensitive sensitivity. Further, addition to the two phase-compensating sections provided at the front and the rear stages of the assist map, a vibration state detecting function is provided for detecting a vibration state of the handle, the two phase compensating sections may perform the phase compensation when the vibration state is detected, passing through the two phase compensating sections when no vibration occurs. The detection of the vibration state is capable of performing based on the motor angular velocity and the steering torque as shown in Patent Document 1.

Figure 12:
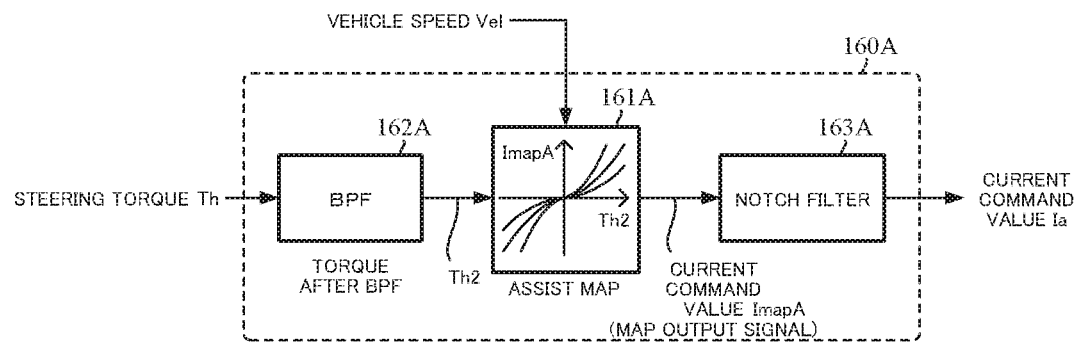
FIG. 12 is a block diagram showing a constitution example of a current command value calculating section (the second embodiment) with a compensation function according to the present invention.

In also the second embodiment of the present invention, although the current command value calculating section 160A with a compensation function calculates the current command value Ia based on the steering torque Th and the vehicle speed Vel, a BPF 162A is provided at a front stage of an assist map 161A as well as a reverse characteristic notch filter 163A is provided at a rear stage of the assist map 161A as shown in FIG. 12. The BPF 162A passes through only a central frequency (approximate 3-10 [Hz]) with respect to the inputted steering torque Th and has a function to amplify the amplitude. The steering torque Th2 after the BPF characteristic-compensated at the BPF 162A is inputted into the assist map 161A. The assist map 161A has a characteristic (the characteristic that the sloping increases for an absolute vale of the inputted steering torque Th2) similar to FIG. 3 and outputs the current command value (a map output signal) ImapA corresponding to the steering torque Th2 after the BPF in a vehicle speed sensitive-type. The current command value (the map output signal) ImapA is inputted into the notch filter 163A at the rear stage, and the current command value Ia characteristic-compensated at the notch filter 163A is inputted into the adding section 116A.

The degrees of the BPF 162A and the notch filter 163A are respectively equal to or more than a secondary order, a peak frequency [Hz] set at the BPF 162A provided at the front stage of the assist map 161A is set in the vicinity of the handle frequency [Hz], and a peak frequency [Hz] set at the notch filter 163A provided at the rear stage of the assist map 161A is within ±10% for the peak frequency set at the BPF 162A. The effect of the handle vibration-damping is at best a range of ±10% and it is possible to minutely adjust the range in correspondence with the feeling.

Figure 13:
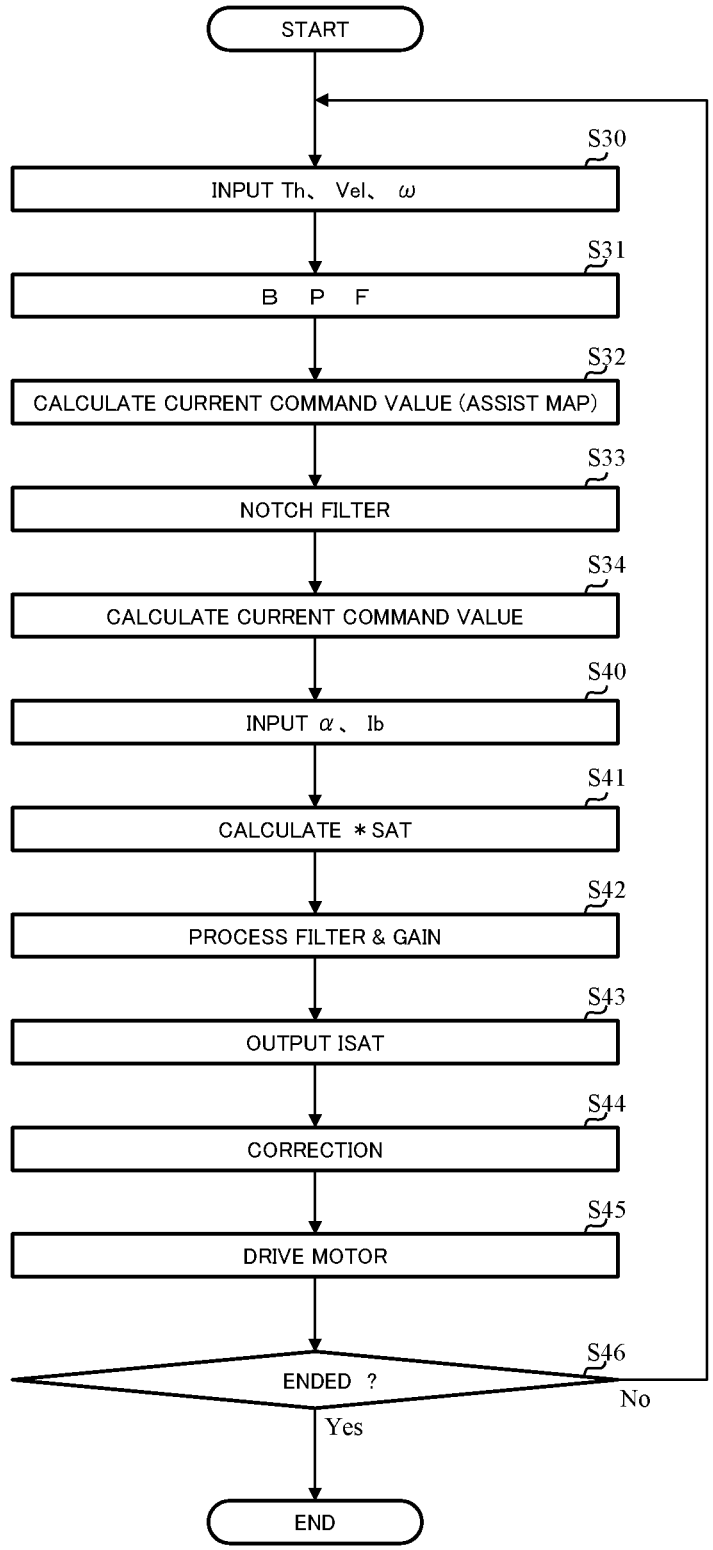
FIG. 13 is a flowchart showing an operation example (the second embodiment) of the present invention.

In such a constitution, an operation example (the second embodiment) of the present invention will be described with reference to a flow chart of FIG. 13.

Figure 14:
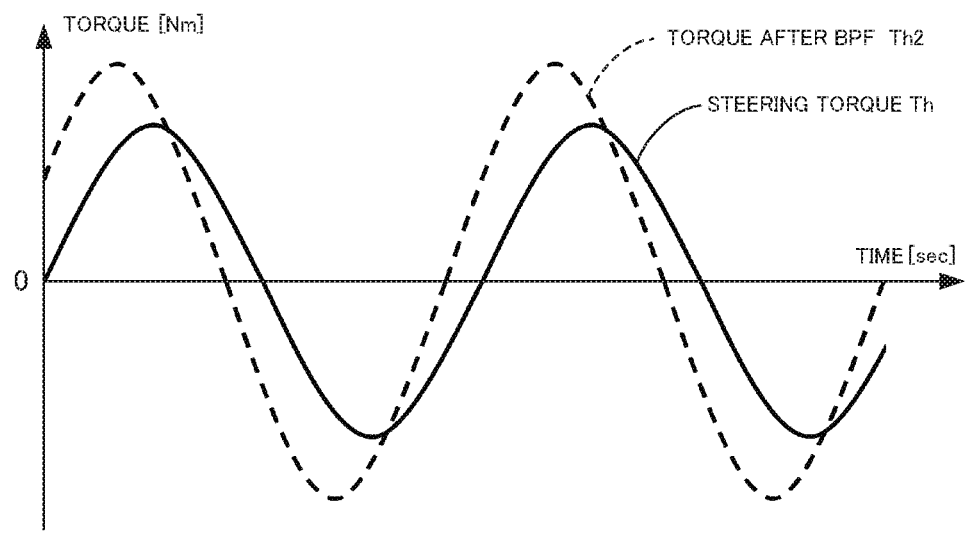
FIG. 14 is a characteristic diagram showing an example of a characteristic of a BPF (band pass filter)

First, the steering torque Th, the vehicle speed Vel and the steering angle velocity ω are inputted (Step S30), and the steering torque Th is characteristic-compensated at the BPF 162A (Step S31). FIG. 14 shows a compensation characteristic example of the BPF 162A, a phase of the steering torque Th2 after the BPF passed through the BPF 162A leads as shown by a dashed-line in FIG. 14 due to the resonance of the inertia of the handle and the spring characteristic of the torsion bar in a case that the steering torque Th vibrates as shown by a real line, and the amplitude becomes greater than the steering torque Th before the compensation.

Figure 15:
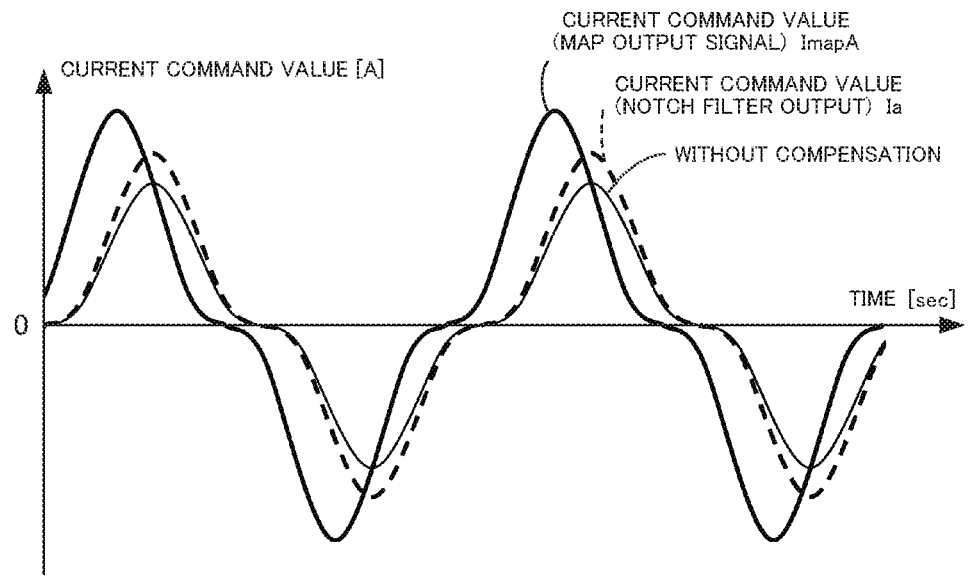
FIG. 15 is a characteristic diagram showing an example of a characteristic of a notch filter.

Then, the steering torque Th2 after the BPF is inputted into the assist map 161A and the current command value (the map output signal) ImapA is calculated (Step S32), and the current command value ImapA is inputted into the notch filter 163A at the rear stage and is characteristic-compensated (Step S33). The characteristic of the notch filter 163A is delayed as shown by a dashed-line in FIG. 15 for the current command value (the map output signal) ImapA of a real line (thick line) being inputted into the notch filter 163A and outputs the current command value Ia of which amplitude is small. The phase does not vary in comparison with a signal without the compensation and the amplitude becomes great. The increasing of the component of the vibrating frequency acts to suppress the handle vibration.

Figure 16A:
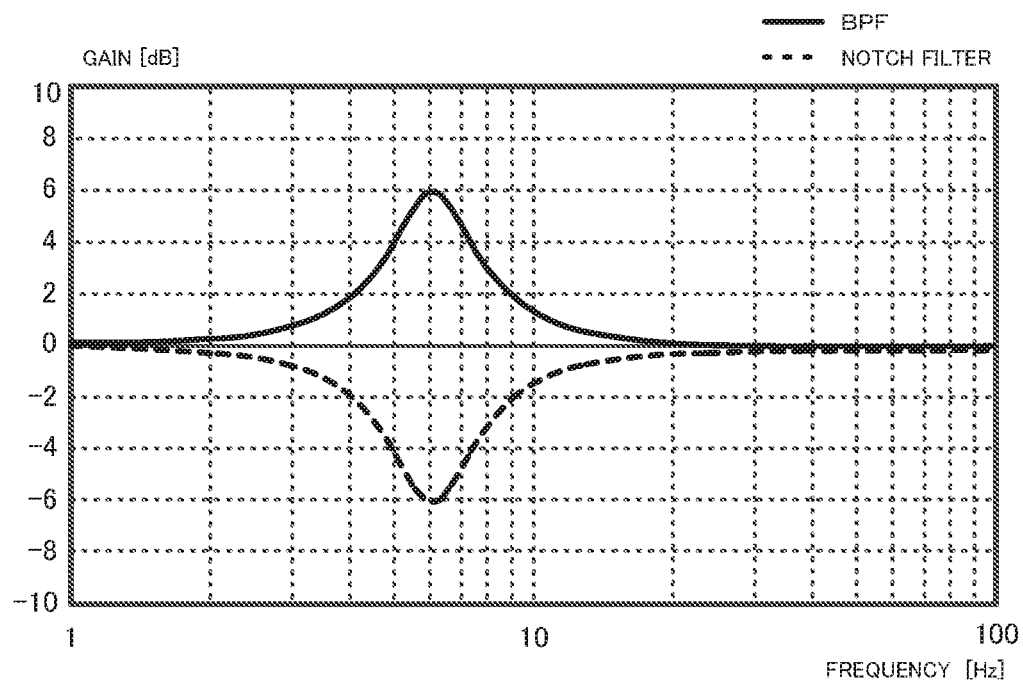
FIGS. 16A and 16B are Bode diagram showing characteristic examples of the BPF and the notch filter.
Figure 16B:
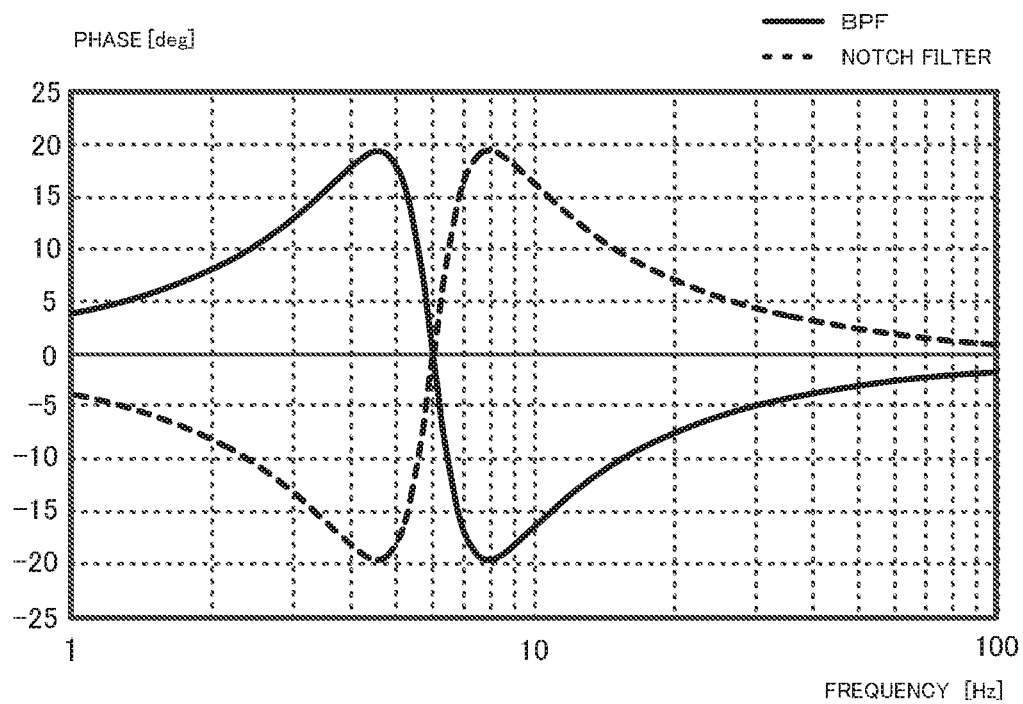

Moreover, the respective gains of the BPF 162A and the notch filter 163A as well as the frequency characteristics of the respective phases are shown in Bode diagram in FIGS. 16A and 16B.

The current command value Ia calculated at the current command value calculating section 160A with a compensation function becomes a current command value Ib by adding at the adding section 116A with the differential value from the differential control section 112, and the yaw-rate signal YR is calculated at the yaw-rate convergence control section 113. The current command value Ic added the yaw-rate signal YR at the adding section 116B is outputted as the current command value Id through the robust stabilization compensating section 114 (Step S34).

The current command value Ib and the steering angle acceleration α calculated at the motor-angular acceleration calculating section 124 are inputted into the SAT-compensation value calculating section 150 (Step S40), and the SAT-estimated value *SAT is calculated at the adding sections 151 and 152 and the subtracting section 153 (Step S41). The SAT-estimated value *SAT is filter-processed at the filter 154 and is gain-processed at the gain section 155 (Step S42), and the SAT-compensated value ISAT is outputted (Step S43). The current command value Id is corrected at the adding section 116C (Step S44), the corrected current command value Ie is inputted into the motor-system control section 120, and the motor 20 is driven through the compensating section 121 and the motor driving section 23 (Step S45). The above operations are repeated until the ending (Step S46).

Figure 17:
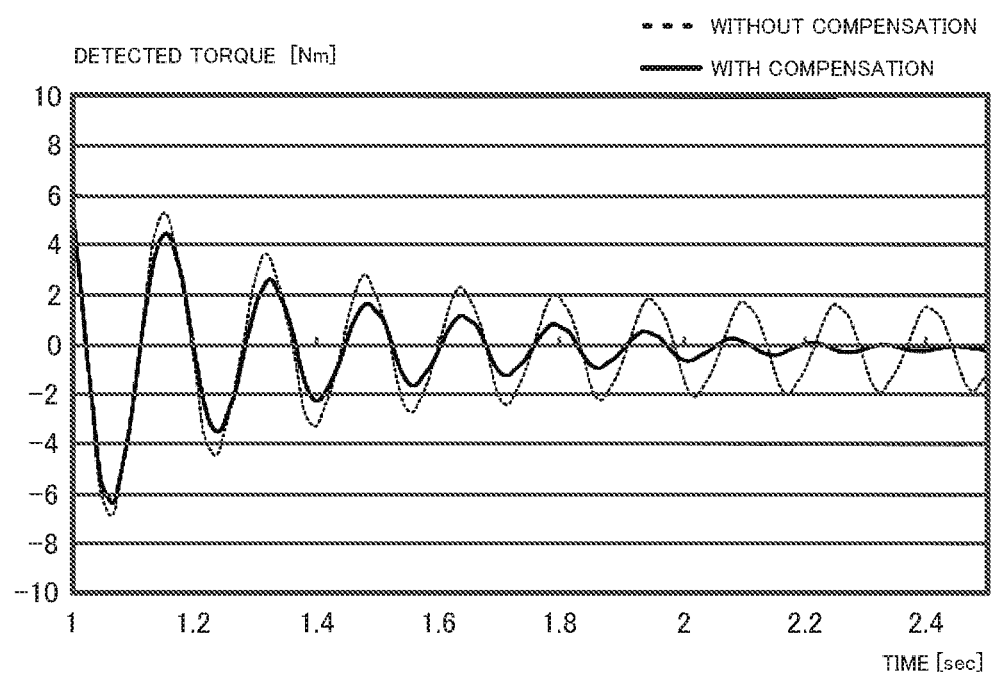
FIG. 17 is a characteristic diagram showing an example (with compensation, without compensation) of a time responsibility of the steering torque.

FIG. 17 is a characteristic chart showing an example operation of the second embodiment and shows a time response (dashed line) of the steering torque (proportional to a torsion angle of the torsion bar) when the disturbance torque is applied with no hands at a state that the easy occurring of the handle vibration is intentionally prepared. FIG. 17 shows a simulation result (real line) in comparison with presence of the provisions of the BPF 162A at the front stage of the assist map 161A and of the revers characteristic notch filter 163A at the rear stage of the same. The degrees of the BPF and the notch filter using the simulation are respectively secondary order, the peak frequencies are set to 6 [Hz] and has a frequency characteristic as shown in Bode diagram of FIG. 16. Consequently, it is clear that the convergence of the vibration is rapid by phase-compensating at the front and the rear stages of the assist map and that the vibration is suppressed.

Moreover, the BPF provided at the front stage of the assist map and the notch filter provided at the rear stage of the assist map may be changed with a vehicle speed sensitivity or a torque sensitivity. Further, addition to the BPF and the notch filter provided at the front and the rear stages of the assist map, a vibration state detecting function is provided for detecting a vibration state of the handle, the BPF and the notch filter may perform the characteristic compensation when the vibration state is detected, passing through the BPF and the notch filter when no vibration occurs. The detection of the vibration state is capable of performing based on the motor angle velocity and the steering torque as shown in Patent Document 1.

Figure 18:
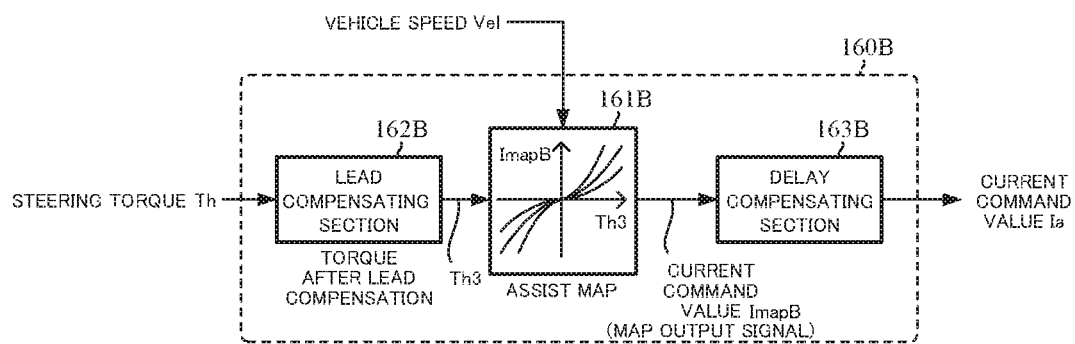
FIG. 18 is a block diagram showing a constitution example of a current command value calculating section (the third embodiment) with a compensation function according to the present invention.

Although the current command value calculating section 160B with a compensation function according to the third embodiment also calculates the current command value Ia by using the assist map based on the steering torque Th and the vehicle speed Vel, a lead-system compensating section 162B is provided at a front stage of an assist map 161B as well as a reverse characteristic delay-system compensating section 163B is provided at a rear stage of the assist map 161B as shown in FIG. 18. The lead-system compensating section 162B has a function of a phase-lead with respect to the inputted steering torque Th, and the torque Th3 after the phase-lead compensation lead-compensated at the lead-system compensating section 162B is inputted into the assist map 161B. The assist map 161B has a characteristic (the characteristic that the sloping increases for an absolute vale of the inputted steering torque Th3) similar to FIG. 3 and outputs the current command value (a map output signal) ImapB corresponding to the steering torque Th3 after the compensation in a vehicle speed sensitive-type. The current command value (the map output signal) ImapB is inputted into the delay-system compensating section 163B at the rear stage, and the current command value Ia delay-compensated at the delay-system compensating section 163B is inputted into the adding section 116A.

The degree of the compensating section 162B at the front stage of the assist map 161B may be a primary, or a secondary or more than tertiary, and the degree of the compensating section 163B at the rear stage of the assist map 161B also may be a primary, or a secondary or more than tertiary. The cut-off frequency [Hz] set at the lead-system compensating section 162B is lower than the handle frequency [Hz] and is set to a frequency of the steering region being equal to or more than 3 [Hz]. The cut-off frequency [Hz] set at the delay-system compensating section 163B provided at the rear stage of the assist map 161B is within ±10% for the cut-off frequency set at the lead-system compensating section 162B. The effect of the handle vibration-damping is at best a range of ±10% and it is possible to minutely adjust the range in correspondence with the feeling.

Figure 19:
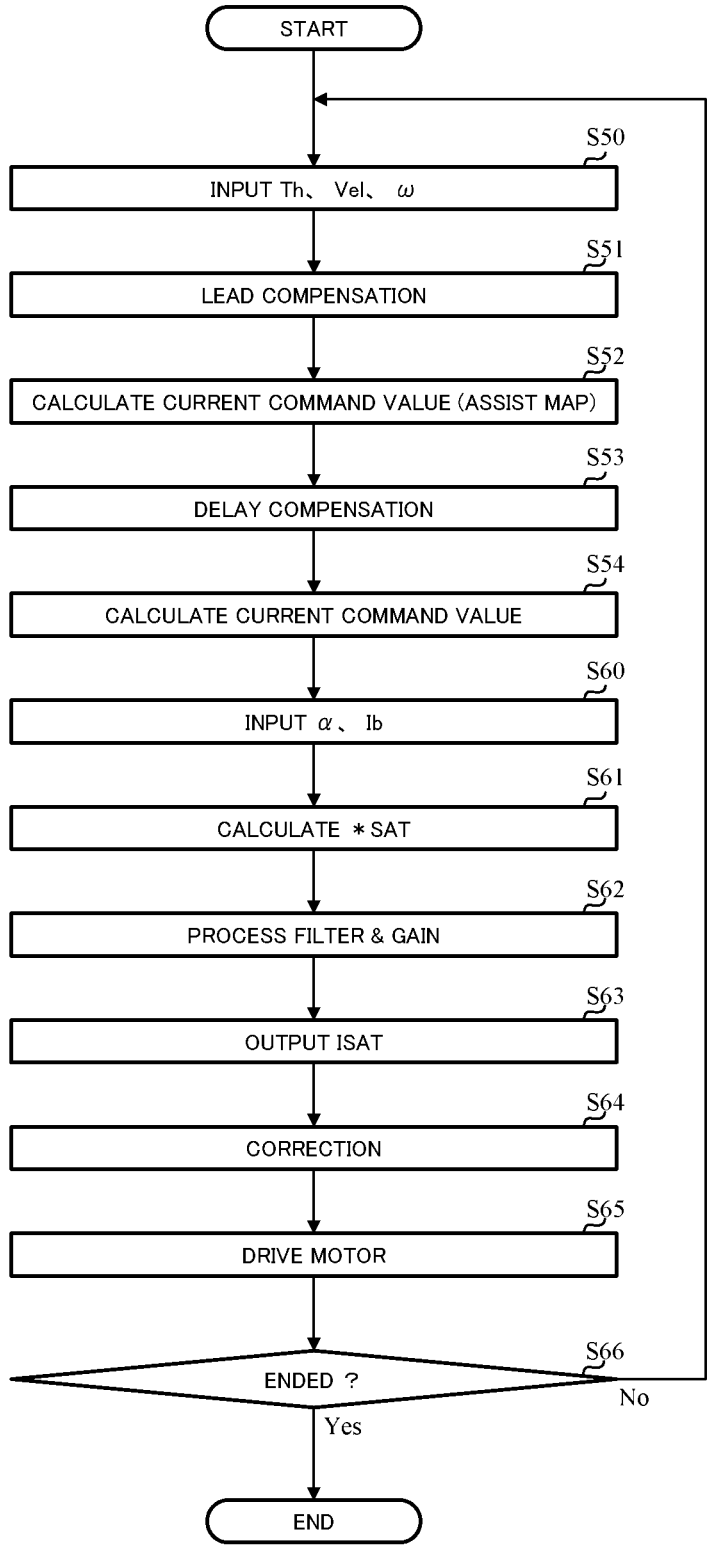
FIG. 19 is a flow chart showing an operation example (the third embodiment) of the present invention.

In such a constitution, an operation example (the third embodiment) of the present invention will be described with reference to a flow chart of FIG. 19.

Figure 20:
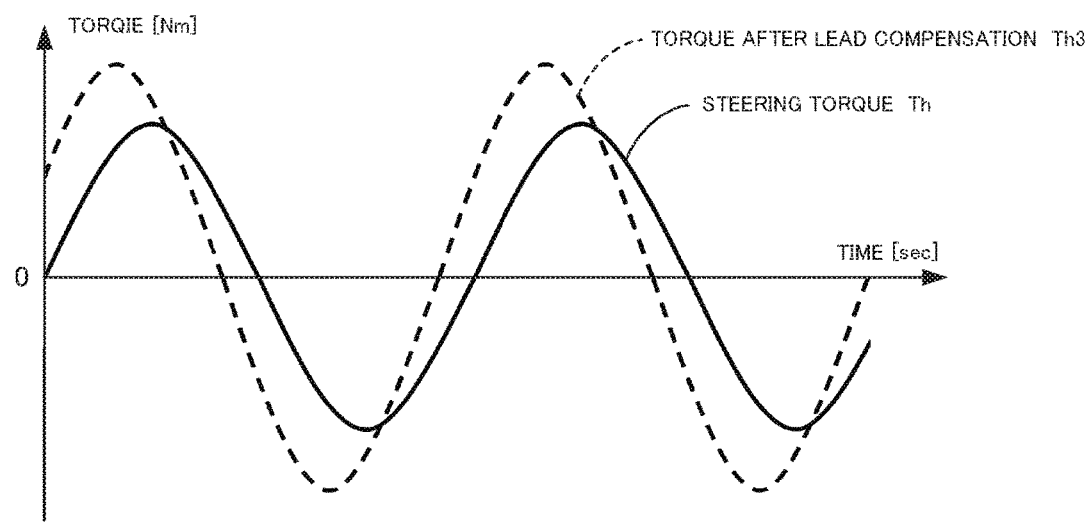
FIG. 20 is a characteristic diagram showing an example of a characteristic of a phase-lead system compensating section.

First, the steering torque Th, the vehicle speed Vel and the steering angle velocity ω are inputted (Step S50), and the steering torque Th is lead-compensated at the lead-system compensating section 162B (Step S51). FIG. 20 shows a compensation characteristic example of the primary system of the lead-system compensating section 162B, the steering torque Th3 after the compensation passed through the lead-system compensating section 162B leads as shown by a dashed-line, due to the resonance of the inertia of the handle and the spring characteristic of the torsion bar, in a case that the steering torque Th vibrates as a real line in FIG. 8, and the amplitude becomes greater than the steering torque Th before the compensation.

Figure 21:
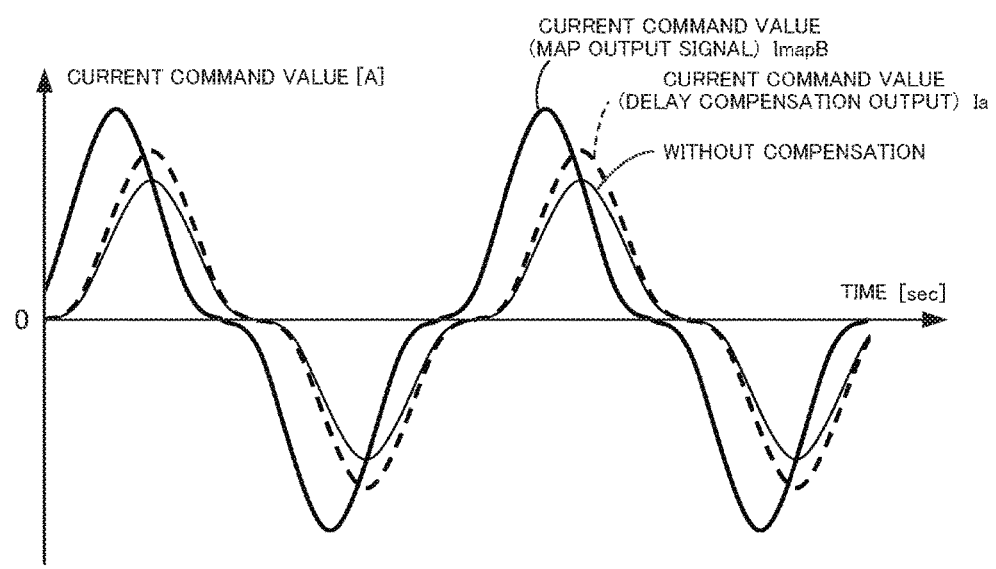
FIG. 21 is a characteristic diagram showing an example of a characteristic of a phase-delay system compensating section.

Then, the steering torque Th3 after the compensation is inputted into the assist map 161B and the current command value (the map output signal) ImapB is calculated (Step S52), and the current command value ImapB is inputted into the delay-system compensating section 163B at the rear stage and is characteristic-compensated (Step S53). The characteristic of the primary system of the delay-system compensating section 163B is delayed as shown by a dashed-line in FIG. 21 for the current command value (the map output signal) ImapB of a real line (thick line) being inputted into the delay-system compensating section 163B and outputs the current command value Ia of which amplitude is small. The phase does not vary in comparison with a signal without the compensation and the amplitude becomes great. The increasing of the component of the vibrating frequency acts to suppress the handle vibration.

Figure 22A:
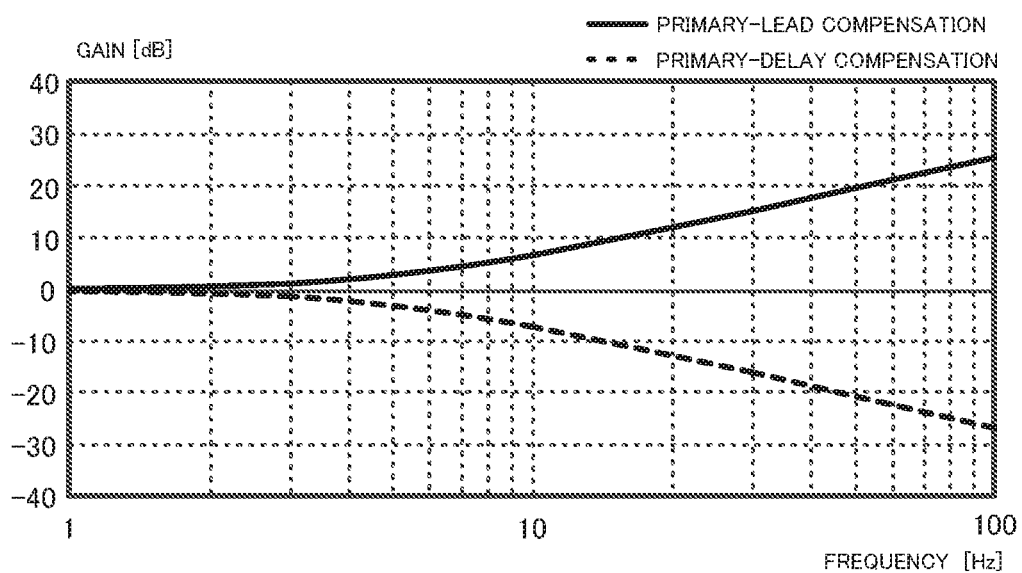
FIGS. 22A and 22B are Bode diagram showing a characteristic example of the compensating section (a lead system, a delay system)
Figure 22B:
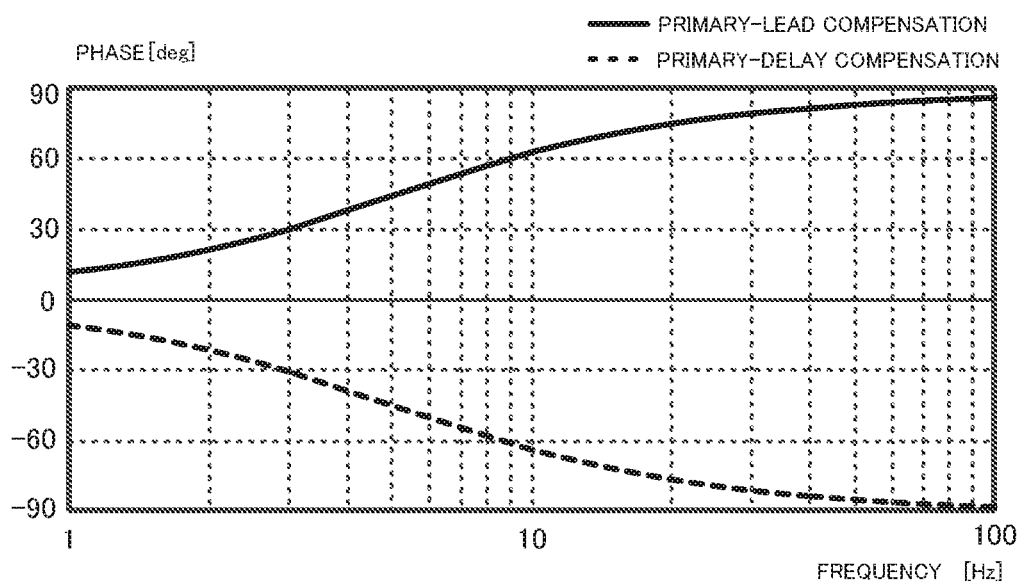

Moreover, the respective gains of the lead-compensation of the lead-system compensating section 162B and the delay-compensation of the delay-system compensating section 163B as well as the frequency characteristics of the respective phases are shown in Bode diagram in FIGS. 22A and 22B. The present embodiment shows a case that the primary lead-system compensation (the cut-off frequency is 5 [Hz]) is set for the lead-system compensation and the primary delay-system compensation (the cut-off frequency is 5 [Hz]) is set for the delay-system compensation.

The current command value Ia calculated at the current command value calculating section 160B with a compensation function becomes the current command value Ib by adding at the adding section 116A with the differential value from the differential control section 112, and the yaw-rate signal YR is calculated at the yaw-rate convergence control section 113. The current command value Ic added the yaw-rate signal YR at the adding section 116B is outputted as the current command value Id through the robust stabilization compensating section 114 (Step S54).

The current command value Ib and the steering angle acceleration α calculated at the motor-angular acceleration calculating section 124 are inputted into the SAT-compensation value calculating section 150 (Step S60), and the SAT-estimated value *SAT is calculated at the adding sections 151 and 152 and the subtracting section 153 (Step S61). The SAT-estimated value *SAT is filter-processed at the filter 154 and is gain-processed at the gain section 155 (Step S62), and the SAT-compensated value ISAT is outputted (Step S63). The current command value Id is corrected at the adding section 116C (Step S64), the corrected current command value Ie is inputted into the motor-system control section 120, and the motor 20 is driven through the compensating section 121 and the motor driving section 23 (Step S65). The above operations are repeated until the ending (Step S66).

Figure 23:
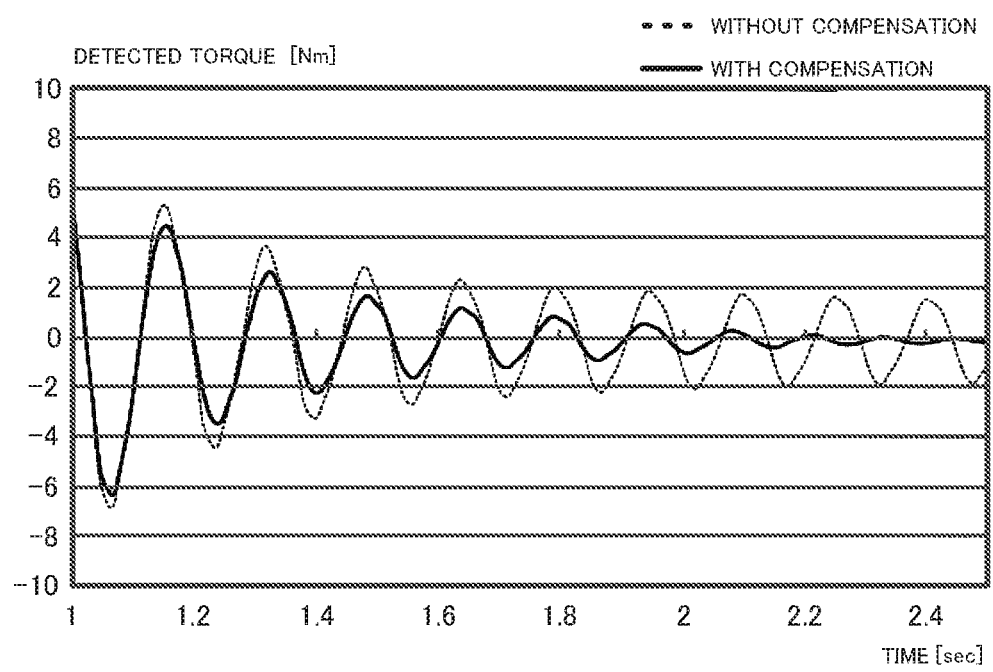
FIG. 23 is a characteristic diagram showing an example (with compensation, without compensation) of a time responsibility of the steering torque.

FIG. 23 is a characteristic chart showing an example operation of the third embodiment and shows a time response (dashed line) of the steering torque (proportional to a torsion angle of the torsion bar) when the disturbance torque is applied with no hands at a state that the easy occurring of the handle vibration is intentionally prepared. FIG. 23 shows a simulation result (real line) in comparison with presence of the provisions of the BPF 162A at the front stage of the assist map and of the reverse characteristic notch filter 163A at the rear stage of the same. The degrees of the BPF and the notch filter using the simulation are respectively primary and have a frequency characteristic as shown in FIG. 22. In this embodiment, the primary lead-system compensation (the cut-off frequency is 5 [Hz]) is set in the lead-system compensation, and the primary delay-system compensation (the cut-off frequency is 5 [Hz]) is set in the delay-system compensation. Consequently, it is clear that the convergence of the vibration is rapid by phase-compensating at the front and the rear stages of the assist map and that the vibration is suppressed.

Moreover, the two compensating sections provided at the front and the rear stages of the assist map may be changed with the vehicle speed sensitivity or the torque sensitivity. Further, addition to the BPF and the notch filter provided at the front and the rear stages of the assist map, a vibration state detecting function is provided for detecting a vibration state of the handle, the BPF and the notch filter may perform the characteristic compensation when the vibration state is detected, passing through the BPF and the notch filter when no vibration occurs. The detection of the vibration state is capable of performing based on the motor angular velocity and the steering torque as shown in Patent Document 1.

EXPLANATION OF REFERENCE NUMERALS 1 steering wheel (handle)
2 column shaft (steering shaft)
10 torque sensor
12 vehicle speed sensor
13 battery
20 motor
23 motor driving section
30, 100 control unit (ECU)
31 current command value calculating section
35 PI-control section
36 PWM-control section
110 torque system control unit
120 motor system control unit
122 disturbance estimating section
152 steering angle sensor
150 SAT-compensation value calculating section
160 current command value calculating section with compensation function
161, 161A, 161B assist map
162 phase compensating section (phase-lead)
162A band pass filter (BPF)
162B lead-system compensating section
163 phase compensating section (phase-delay)
163A notch filter
163B delay-system compensating section

The invention claimed is:

1. An electric power steering apparatus that calculates a current command value with reference to an assist map inputting a steering torque and assist-controls a steering system of a vehicle by driving a motor based on said current command value, comprising:
   a first compensating section provided at a front stage of said assist map; and
   a second compensating section provided at a rear stage of said assist map;
   wherein said current command value is calculated with a characteristic of which sloping increases for an absolute value of said steering torque being inputted into said first compensating section and is outputted from said second compensating section, and a vibration of a steering wheel is suppressed, and wherein said first compensating section is a first phase compensating section and said second compensating section is a second phase compensating section, and said first phase compensating section and said second phase compensating section are reverse characteristic of each other.

2. The electric power steering apparatus according to claim 1, wherein said first phase compensating section is a phase-lead compensation and said second phase compensating section is a phase-delay compensation.

3. The electric power steering apparatus according to claim 2, wherein a setting frequency of a zero point of said first phase compensating section is lower than a handle frequency and is set to 3 hertz or more.

4. The electric power steering apparatus according to claim 3, wherein setting frequencies of a pole and a zero point of said second phase compensating section are respectively within a range of ±10% for setting frequencies of a pole and a zero point of said first phase compensating section.

5. The electric power steering apparatus according to claim 2, wherein a setting frequency of a pole of said first phase compensating section is higher than a handle frequency.

6. The electric power steering apparatus according to claim 5, wherein setting frequencies of a pole and a zero point of said second phase compensating section are respectively within a range of ±10% for setting frequencies of a pole and a zero point of said first phase compensating section.

7. The electric power steering apparatus according to claim 2, wherein setting frequencies of a pole and a zero point of said second phase compensating section are respectively within a range of ±10% for setting frequencies of a pole and a zero point of said first phase compensating section.

8. The electric power steering apparatus according to claim 1, wherein said first compensating section is a band pass filter, said second compensating section is a notch filter, and said band pass filter and said notch filter are reverse transfer function characteristic of each other.

9. The electric power steering apparatus according to claim 8, wherein degrees of said band pass filter and said notch filter are respectively equal to or more than a secondary order.

10. The electric power steering apparatus according to claim 9, wherein a peak frequency set at said band pass filter is set in a vicinity of a handle frequency.

11. The electric power steering apparatus according to claim 8, wherein a peak frequency set at said band pass filter is set in a vicinity of a handle frequency.

12. The electric power steering apparatus according to claim 11, wherein a peak frequency set at said notch filter is within a range of ±10% for said peak frequency set at said band pass filter.

13. The electric power steering apparatus according to claim 1, wherein said first compensating section is a lead-system compensating section, said second compensating section is a delay-system compensating section, and said lead-system compensating section and said delay-system compensating section are reverse transfer function characteristic of each other.

14. The electric power steering apparatus according to claim 13, wherein said lead-system compensating section is a primary lead-compensation, and said delay-system compensating section is a primary delay-compensation.

15. The electric power steering apparatus according to claim 14, wherein a cutoff frequency set at said lead-system compensating section is lower than a handle frequency and is set to 3 hertz or more.

16. The electric power steering apparatus according to claim 13, wherein said lead-system compensating section is equal to or more than secondary lead-compensation, and said delay-system compensating section is equal to or more than secondary delay-compensation.

17. The electric power steering apparatus according to claim 16, wherein a cutoff frequency set at said lead-system compensating section is lower than a handle frequency and is set to 3 hertz or more.

18. The electric power steering apparatus according to claim 13, wherein a cutoff frequency set at said lead-system compensating section is lower than a handle frequency and is set to 3 hertz or more.

19. The electric power steering apparatus according to claim 18, wherein a cut-off frequency set at said delay-system compensating section is within a range of ±10% for said cutoff frequency set at said lead-system compensating section.

20. The electric power steering apparatus according to claim 1, wherein said assist map is a vehicle speed sensitive-type.

* * * * *